No. 769,718. PATENTED SEPT. 13, 1904.
W. SHERBONDY & S. H. STURGEON.
TIRE.
APPLICATION FILED MAY 3, 1904.
NO MODEL.

WITNESSES:
C. H. Walker
L. L. Morrill

Walter Sherbondy and
Samuel H. Sturgeon INVENTORS.

BY Shepherd & Parker,
Attorneys

No. 769,718. Patented September 13, 1904.

UNITED STATES PATENT OFFICE.

WALTER SHERBONDY AND SAMUEL H. STURGEON, OF AKRON, OHIO.

TIRE.

SPECIFICATION forming part of Letters Patent No. 769,718, dated September 13, 1904.

Application filed May 3, 1904. Serial No. 206,189. (No model.)

*To all whom it may concern:*

Be it known that we, WALTER SHERBONDY and SAMUEL H. STURGEON, citizens of the United States, residing at No. 396 Wooster avenue, in the city of Akron, in the county of Summit and State of Ohio, have invented a certain new and useful Improvement in Tires, of which the following is a specification.

Our invention relates to tires, and has for its object to provide a cushion-tire adapted for use on automobiles or other vehicles and which may be manufactured cheaply and is possessed of a high degree of resiliency.

The only tire in common use of the desired degree of resiliency for use on automobiles or motors or other bicycles is the pneumatic tire, which is subject to a deflation by puncture.

Our invention produces a tire approximately as resilient as a pneumatic tire and which is practically not only puncture-proof, but which will not be detrimentally affected by being punctured.

With these and other objects in view our present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of our invention.

Figure 1:
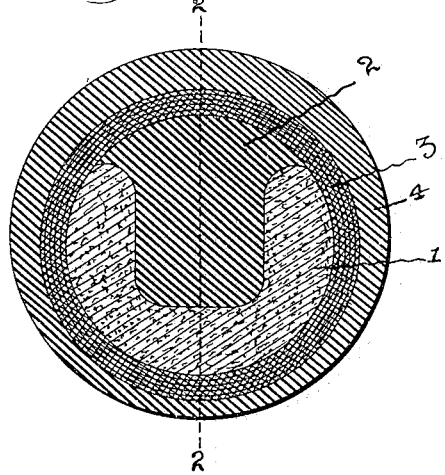
Figure 2:
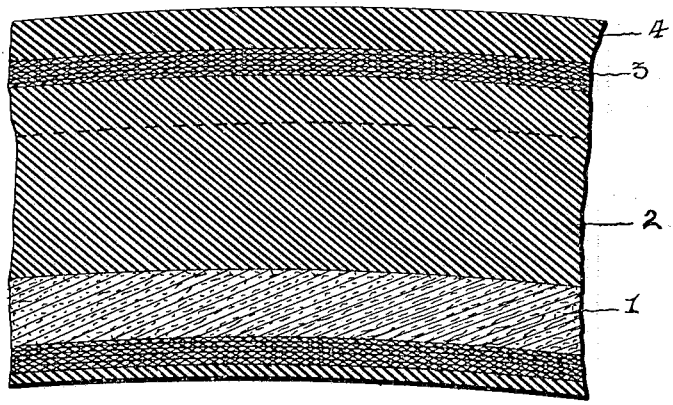

In the accompanying drawings, Figure 1 is a cross-sectional view of the preferred form of our invention, and Fig. 2 is a longitudinal sectional view on the line 2 2, Fig. 1.

Like reference-numerals designate corresponding parts in each of the views.

In constructing a tire in accordance with our invention we take any cheap elastic material—such as, for instance, cork, leather, wood, cloth, paper, or asbestos—reduced to particles of a size convenient for use, preferably in the form of a powder, and from such particles we mold core 1. This core is in the form of a ring and of a diameter approximating that of the wheel it is designed to fit. In cross-section it is in the form of an arc, with a U-shaped groove within the outer periphery thereof, as shown in Fig. 1. The particles composing this core are held together by any sticky or adhesive material, as glue or paste or rubber, and are molded under pressure into the form shown. Within the groove-like aperture of core 1 we place an elastic cushion 2, composed, preferably, of caoutchouc or other similar gum in the plastic state. We entirely fill the groove with this gum and to a considerable distance beyond until the core and the gum produce a ring substantially circular in cross-section, as shown. About the ring formed by core 1 and cushion 2 we wind a plurality of convolutions of fabric 3, preferably of canvas or similar material and which is preferably cut on the "bias," as is usual in tire construction. About the fabric 3 is placed more caoutchouc or similar gum 4 in a plastic condition and so disposed as to be thicker at the tread or outer periphery than at any other point. While forming a ring circular in cross-section, the outer circle of gum is eccentric to the circle formed by the fabric 3. The entire tire so formed is then placed in molds of the proper conformation, submitted to the pressure, and vulcanized in the usual manner.

It is evident that the form of the tire may be modified to correspond to the shape of any particular rim or any desired means of attachment of the tire to the wheel without departing from or sacrificing any of the advantages of our invention.

Having thus described our invention, what we claim as novel, and desire to secure by Letters Patent, is—

1. In a tire, an integral core molded in the form of a circle and exhibiting a cross-section bounded by an arc, a groove within the arc and curves joining the extremities of the groove and the arc and an elastic material entirely filling the groove and extending beyond the extremities thereof and covering the extremities of the core.

2. In a tire, an integral core composed of a granular and an adhesive material molded in the form of a circle with a cross-section exhibiting an outer boundary in the form of an arc, a groove within the arc extending beyond the center of curvature of the arc, curves joining the extremities of the arc and the groove, an elastic material entirely filling said groove and extending beyond the extremities thereof and covering the extremities of the core, and forming with the core, a complete circle.

3. A tire so constructed that a cross-section exhibits a core molded from a granular and an adhesive material bounded by an arc with a groove within the arc, curves joining the extremities of the arc and the groove, an elastic material entirely filling and extending beyond the extremities of the groove and forming with the arc a complete circle, a fabric disposed in successive revolutions about said core and elastic material, and an elastic outer coating disposed as a circle about and eccentric to the fabric.

4. In a tire, an integral core molded in the form of a circle and exhibiting a cross-section bounded by an arc, a groove within the arc formed with substantially parallel sides and extending beyond the center of curvature of the arc and curves joining the extremities of the groove and the arc and an elastic material entirely filling the groove, extending beyond the extremities thereof, and covering the extremities of the core.

5. In a tire, an integral core composed of a granular and an adhesive material molded in the form of a circle with a cross-section exhibiting an outer boundary in the form of an arc and a groove within the arc extending beyond the center of curvature of the arc, curves joining the extremities of the arc and the groove, and an elastic material entirely filling said groove extending beyond the extremities thereof and covering the extremities of the core and forming with the core a complete circle.

6. A tire so constructed that a cross-section exhibits a core molded from a granular and an adhesive material bounded by an arc with a groove within the arc, said groove being formed with substantially parallel sides, curves joining the extremities of the arc and the groove, an elastic material entirely filling and extending beyond the extremities of the groove and forming with the arc a complete circle, a fabric disposed in successive convolutions about said core and elastic material, and an elastic outer coating disposed as a circle about and eccentric to the fabric.

WALTER SHERBONDY.
SAMUEL H. STURGEON.

In presence of—
LESTER HASTINGS,
J. W. STURGEON.